Dec. 24, 1929.  H. E. BROWN  1,740,725
VARIABLE SPEED TRANSMISSION GEARING
Filed Aug. 18, 1927    3 Sheets-Sheet 1

Dec. 24, 1929.　　　H. E. BROWN　　　1,740,725
VARIABLE SPEED TRANSMISSION GEARING
Filed Aug. 18, 1927　　3 Sheets-Sheet 2

Inventor:
Herbert E. Brown,
By Fisher, Towle, Clapp + Soans, Attys.

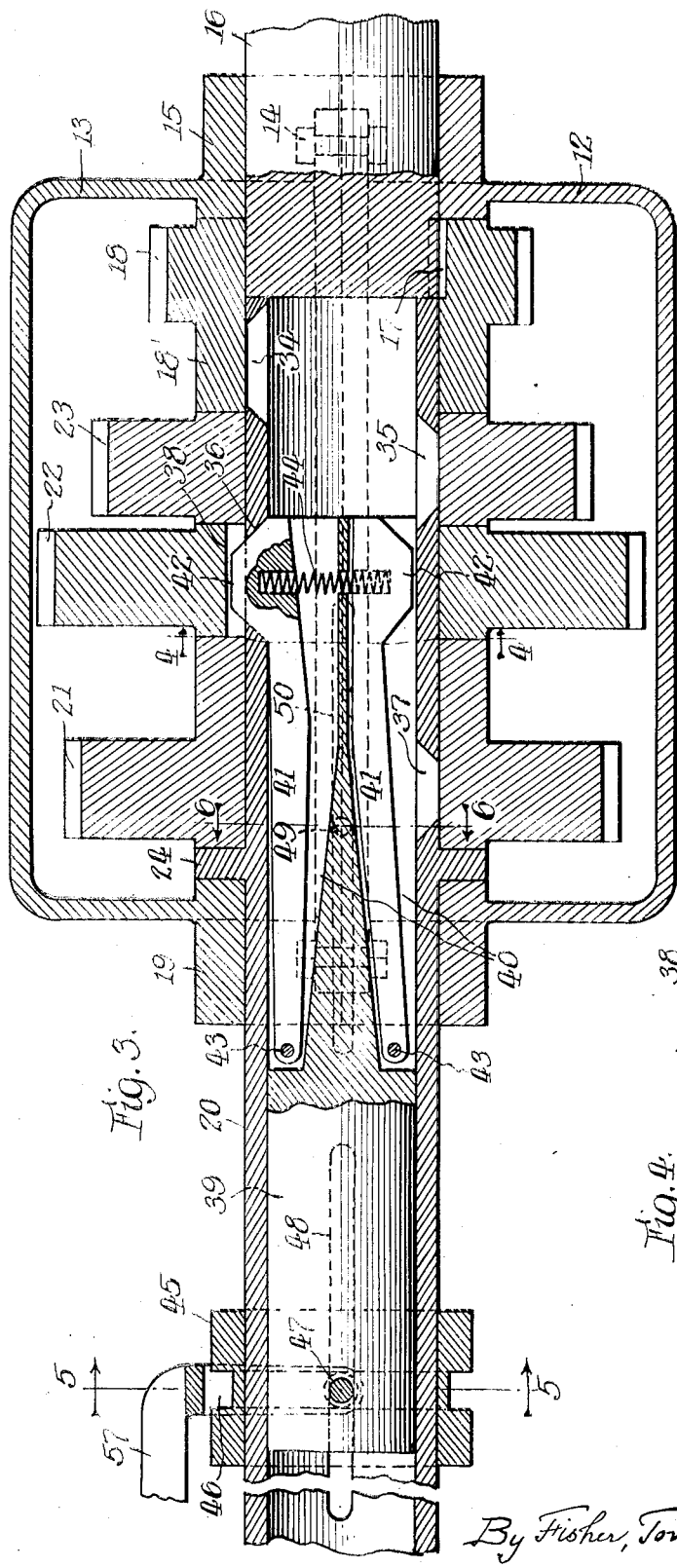

Patented Dec. 24, 1929

1,740,725

UNITED STATES PATENT OFFICE

HERBERT E. BROWN, OF CHICAGO, ILLINOIS, ASSIGNOR OF ONE-HALF TO MAURICE H. MANDELBAUM, OF CHICAGO, ILLINOIS

VARIABLE-SPEED TRANSMISSION GEARING

Application filed August 18, 1927. Serial No. 213,785.

This invention relates to variable speed transmission gearings, such as are commonly employed on automobiles, tractors and motor vehicles generally to effect forward driving at different speed ratios and also rearward driving.

One important object of the present invention is to provide an improved variable speed gearing of that type which in its construction and operation is designed to do away with the intermeshing of gears by a sliding movement which frequently involves clashing and sometimes breaking of the gear teeth. To obviate this objection, I have designed an improved variable speed gearing wherein the co-operating gears are always in mesh. Another object of my invention is to provide an improved variable speed gearing of that type which may be manipulated by a hand lever having simply a straight fore and aft movement, thus doing away with the side jogging movement characteristic of the present standard variable speed gearing. To avoid breaking of the gears and obtain easy starting movement, the present standard variable speed gearing requires the engine clutch to be disconnected when making a change of gear. Another object of my present invention has been to provide a variable speed gearing wherein changes of speed or direction can be effected without disconnecting the clutch and without injury or breakage. A still further object of the invention is to provide a gearing of the type specified, wherein the gear shifting lever need not enter the gear box, but may be located in rear of the latter, thus leaving the top of the gear box plain.

The novel structural features of my present invention, its mode of manipulation, and the advantages inhering therein will be readily understood by persons familiar with this art by reference to the following detailed description, taken in connection with the accompanying drawings wherein I have illustrated a practical and workable embodiment of the invention, and in which—

Fig. 3 is a vertical section taken on the line 3—3 of Fig. 2;

Fig. 4 is a transverse section on the line 4—4 of Fig. 3;

Fig. 5 is a vertical section on the line 5—5 of Fig. 3;

Fig. 6 is a vertical section on the line 6—6 of Fig. 3;

Fig. 7 is a detail of a foot-operated stop for the operating lever viewed on the line 7—7 of Fig. 1;

Fig. 8 is a sectional detail on the line 8—8 of Fig. 1.

Figure 1:
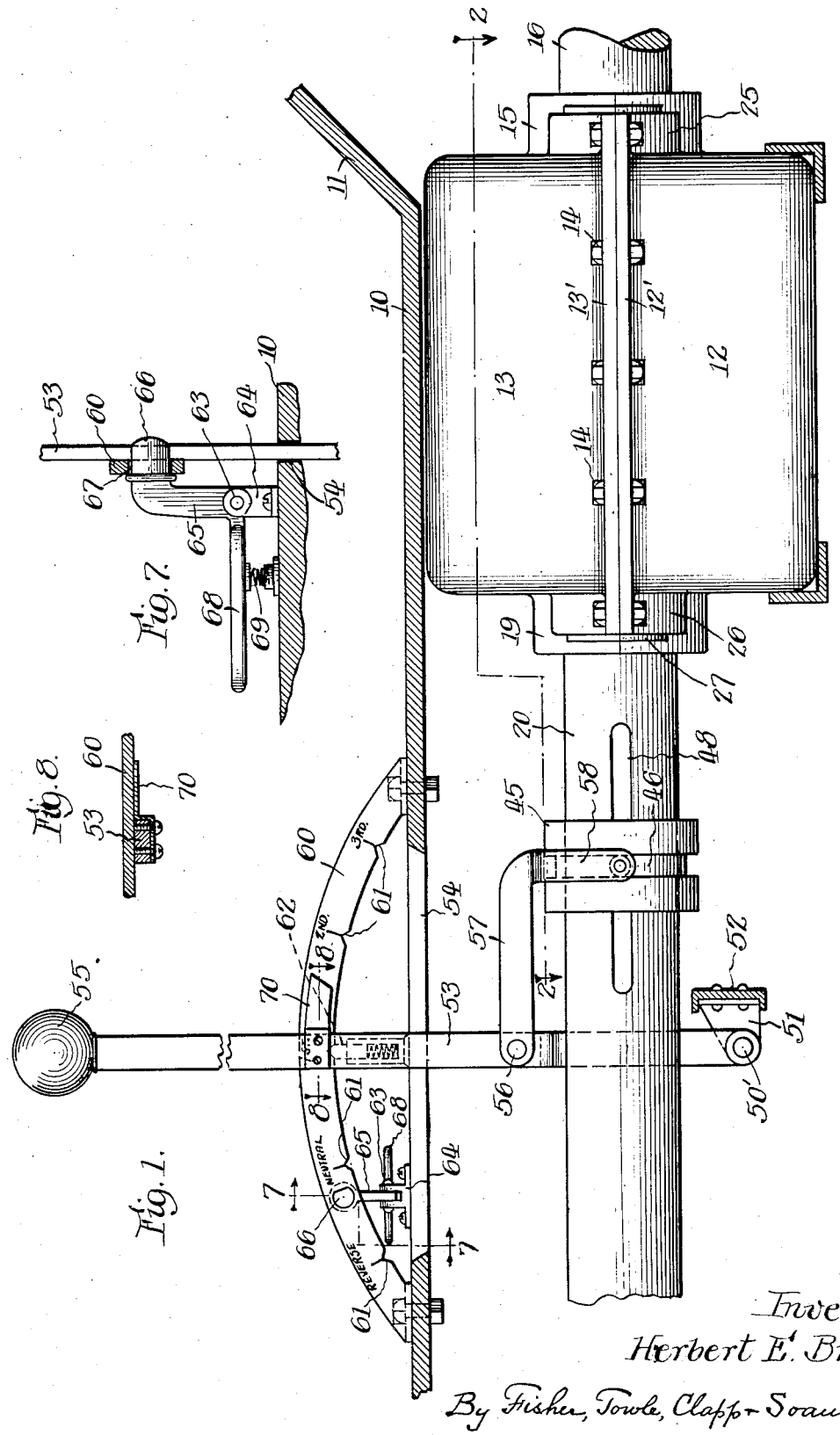
Fig. 1 is a side elevation of the gear box, engine and transmission shafts entering the same, and the operating lever, in vertical section through the front floor and foot board of the car.

Referring to the drawings, in Fig. 1 is shown at 10 the front floor of the car body and at 11 the inclined foot board. Rigidly mounted and secured by any suitable means below the floor board 10 is the gear box comprising in this instance lower and upper halves 12 and 13 formed with mating flanges 12' and 13' united by bolts 14. The forward end of the gear box is formed with a bearing 15 through which extends the forward end of the engine shaft 16. Secured on the inwardly projecting end of the engine shaft 16 as by a key 17 (Fig. 3) is a drive gear 18 formed with an inwardly projecting hub extension 18'. At the rear end of the gear box and in line with the bearing 15 is a similar bearing 19 through which extends a tubular transmission shaft 20, the forward end of the shaft 20 meeting the rear end of the engine shaft 16, as clearly shown in Fig. 3. Loosely mounted on the transmission shaft 20 is a reversing gear 21, a low speed gear 22, and an intermediate speed gear 23. The hubs of these gears all abut against each other, and the entire group of gears, including the drive gear 18, are confined endwise between the inner end of the forward bearing 15 and an annular flange 24 on the transmission shaft 20 which in turn bears against the inner end of the rear bearing 19.

Figure 2:
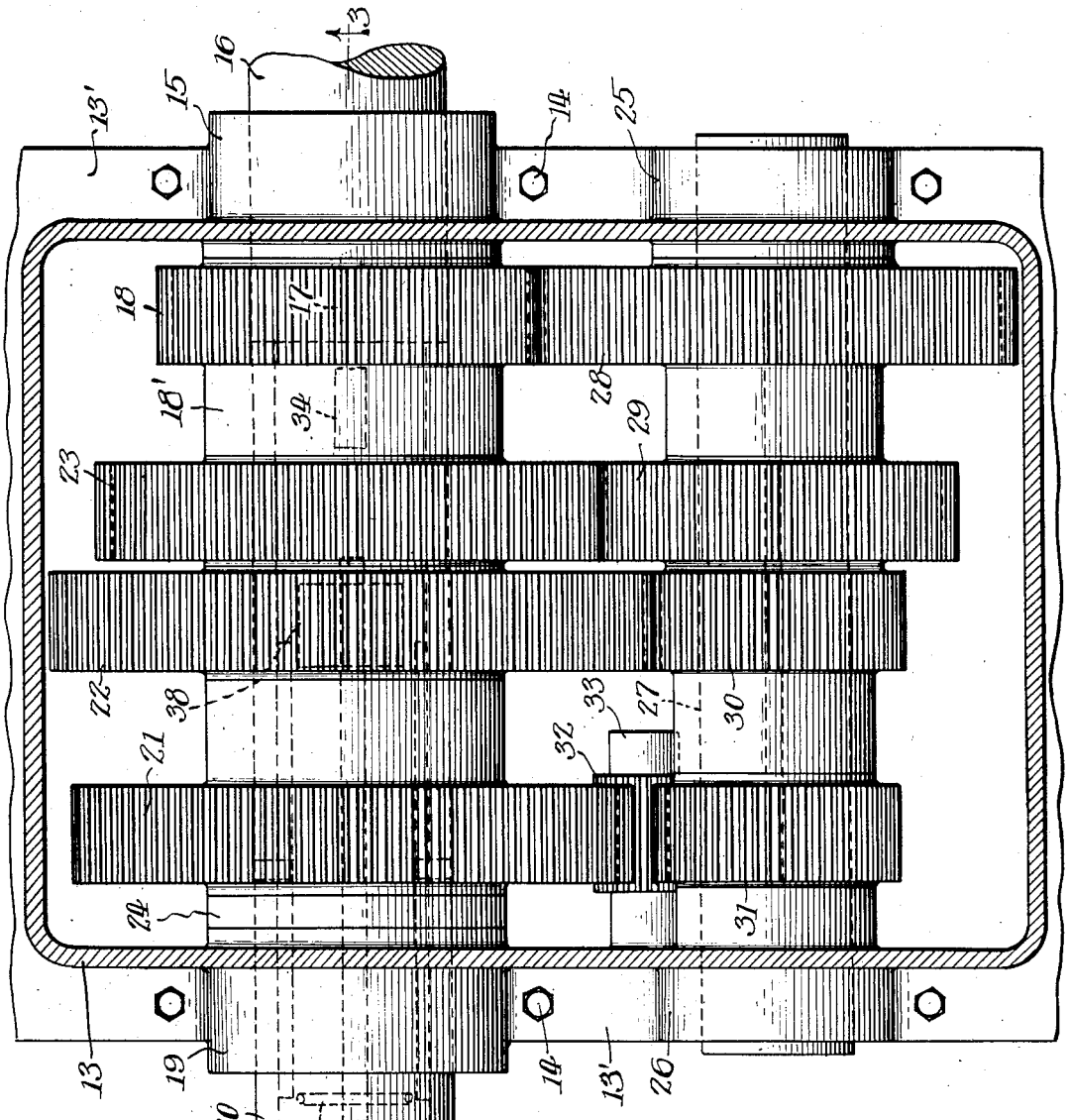
Fig. 2 is an enlarged plan section on the line 2—2 of Fig. 1.

Referring to Fig. 2, in front and rear bearings 25 and 26 on the gear box is journaled a countershaft 27. Keyed fast on the countershaft 27 are a gear 28 continuously in mesh with the drive gear 18, a gear 29 continuously in mesh with the intermediate transmission gear 23, a gear 30 continuously in mesh with the low speed transmission gear 22, and a gear 31 that, through an idler gear 32 journaled on a stub shaft 33, is continuously in driving engagement with the reverse gear 21. From the foregoing it will be seen that when the engine is running all of the gears specified are continuously rotating. The intermeshing pairs of gears are of different relative diameters, as shown, so as to provide the different speed ratios required.

The three forward speeds and the reverse are obtained by a mechanism which selectively locks the forward drive transmission gears 22, 23 and 18, or the reverse gear 21 to the transmission shaft 20, which latter shaft it will be understood is coupled at its rear end through the usual universal joint to the propeller shaft extending to the rear axle drive. Describing this means for locking the transmision gears selectively to the transmission shaft, and referring principally to Figs. 3 to 6 inclusive, it will be observed that the tubular transmission shaft 20 is formed with a longitudinal slot 34 within the hub extension 18' of the drive gear 18, a similar slot 35 within the hub of the intermediate gear 23, a similar slot 36 within the hub of the low speed gear 22, and a similar slot 37 within the hub of the reverse gear 21. All of these slots are preferably formed with tapered end walls as shown, and the slots 35 and 37 are preferably located at diametrically opposite points on the tubular shaft from the slots 34 and 36 and the several slots cooperate with a pair of oppositely disposed locking dogs hereinafter described to avoid weakening of the shaft 20 by placing the slots too close together.

The hub of each of the four gears 21, 22, 23 and 18 is formed with an internal slot 38 which, as best shown in Fig. 4 is preferably made somewhat wider than the slot in the shaft 20. These slots 38, as the gears rotate, of course pass into and out of register with the slots 34, 35, 36 and 37 of the transmission shaft.

Within the tubular shaft 20 and preferably having a free sliding fit therein is a slider 39 that is formed with a pair of oppositely disposed longitudinal slots 40 in which are housed the arms 41 of a pair of locking dogs 42. The arms 41 are pivoted at their rear ends in the slider on pins 43 so as to permit the dogs 42 at their free ends to readily enter the slots 34, 35, 36 and 37 and the slots 38 of the gear hubs under the outward thrust of a compression spring 44; the dogs 42 being formed with tapered front and rear edges, as shown, so as to have a camming action against the tapered end walls of the slots of the transmission shaft.

Describing next the means for actuating the slider 39, slidably mounted on the transmission shaft 20 is a collar 45 formed with a circumferential groove 46. The collar 45 is connected to the slider 39 by a cross-pin 47 (Fig. 5) which extends through longitudinal slots 48 formed in the transmission shaft 20. The cross-pin 47 also serves to lock the slider 39 and the transmission shaft 20 against relative rotation, whereby the dogs 42 are always maintained in line with the slots 34, 35, 36 and 37 of the transmission shaft. Additional means, which may optionally be employed, for locking the slider and transmission shaft against relative rotation consists of pins 49 mounted in the transmission shaft 20 projecting into longitudinal grooves 50 in the slider 39.

Referring to Fig. 1, pivoted at 50' to a bracket 51 attached to a transverse beam 52 of the chassis frame or other suitable support is a hand lever 53 extending upwardly through a slot 54 in the floor 10 and terminating in an operating knob 55. Pivoted at 56 to the lever 53 is a link 57 formed with a depending fork 58 carrying rollers 59 (Fig. 5) traveling in the annular groove 46 of the collar 45. Cooperating with the lever 53 is a segment bar 60 mounted on the floor 10 and formed in one edge thereof with a plurality of notches 61 corresponding to neutral, low, intermediate and high forward, and reverse positions of the lever 53, the notches 61 cooperating with a spring-pressed locking pin 62 on the lever which is disengageable from the notches under a forward or rearward thrurst on the lever. In a construction such as that herein disclosed wherein the changes of speeds and direction are effected by a straight line movement of an operating lever, it is desirable to provide means for preventing accidental excess movement or overthrow of the lever from neutral into reverse position and to accomplish this I preferably provide a simple stop device for preventing such accidental overthrow of the lever past the neutral position on its rearward swing. As herein shown, this stop comprises an elbow lever pivoted at 63 in a bracket 64 attached to the floor 10 and comprising an upstanding arm 65 formed with a horizontally offset finger 66 that extends through a hole 67 in the segment bar 60, and a horizontally extending arm or pedal 68 normally upheld by an underlying spring 69. In the normal position of this stop device, shown in Fig. 7, the finger 66 lies across the path of rearward swing of the lever 53 and thus serves as a stop for the latter when the lever is in neutral position. To throw the gearing into reverse, the driver depresses the pedal 68 with his foot, withdrawing the stop 66. To make it unnecessary to again depress the pedal 68 before the lever can be returned from reverse to neutral or one of the forward drive positions, I preferably equip the lever with a laterally extending keeper 70 (Figs. 1 and 8) that holds the stop finger 66 retracted when the lever is in reverse position and between neutral and reverse positions.

From the foregoing it will be seen that a forward swing of the lever 53 from the neutral position places the transmission gearing successively in low, intermediate and high speeds; while a rearward swing of the lever from neutral position places the gearing in reverse. At each of the positions (except neutral) one of the dogs 42 snaps into one of the slots 34, 35, 36 and 37, the nose of the dog bearing against the inner periphery of the hub of the transmission gear with which it cooperates. The gear is continuously rotating, and the instant the slot or groove 38 of the gear comes into register with the slot of the transmission shaft occupied by the dog, the latter instantly snaps into the slot 38, thus locking the gear to the transmission shaft. When a shift is to be made, a simple forward or backward thrust on the gear shift lever 53 retracts the operating dog 42 under the camming action of the cooperating oblique end walls of the dog and the transmission shaft slot, and permits the other dog 42 to then lock the next gear to the shaft in the manner already described. The speed and direction changes are thus effected by simple forward and rearward movements of the gear shift lever, and the side shift of the lever, characteristic of the present standard variable speed transmission gearing, is entirely eliminated.

I claim—

1. In a variable speed transmission, the combination with a tubular shaft, of a plurality of gears journalled thereon, said gears having clutch elements formed on their inner peripheries and said shaft having openings therein, disposed one in the plane of each of said gears and means disposed within said shaft for clutching the several gears thereto, said means comprising a relatively short solid shaft disposed within and slidably fitting the bore of the tubular shaft, means for connecting said solid shaft for rotation with said tubular shaft but permitting relative axial movements thereof, said solid shaft having a pair of opposed radial grooves formed therein with a central web therebetween, a radially movable clutch member pivoted in each of said grooves, resilient means passing through said web and engaging said clutch members for projecting them through said openings and into engagement with the clutch elements of said gears, and means for sliding said solid shaft.

2. In a variable speed transmission, the combination with a tubular shaft, of a plurality of gears journalled thereon, said gears having clutch elements formed on their inner peripheries and said shaft having openings therein, disposed one in the plane of each of said gears and means disposed within said shaft for clutching the several gears thereto, said means comprising a relatively short solid shaft disposed within and slidably fitting the bore of the tubular shaft, means connecting said solid shaft for rotation with said tubular shaft but permitting relative axial movements thereof, said solid shaft having a pair of opposed elongated grooves formed therein with a central web therebetween, a pair of arms disposed one in each of said grooves and having an end pivoted therein, clutch heads carried by the opposite ends of the respective arms and adapted to be projected through said openings and into engagement with the clutch elements of said gears, a spring passing through said web and engaging the opposed clutch heads for normally urging them apart and means for sliding said shaft to bring said clutch heads into cooperative relation with each said gear.

3. In a variable speed transmission, the combination with a tubular shaft, of a plurality of gears journalled thereon, said gears having clutch elements formed on their inner peripheries and said shaft having openings therein, disposed one in the plane of each of said gears and means disposed within said shaft for clutching the several gears thereto, said means comprising a relatively short solid shaft disposed within and slidably fitting the bore of the tubular shaft, means connecting said solid shaft for rotation with said tubular shaft but permitting relative axial movements thereof, said solid shaft having a pair of opposed elongated grooves formed therein, a pair of arms disposed one in each of said grooves and each having an end pivoted therein, clutch heads formed on the opposite ends of the respective arms and adapted to be projected through said openings and into engagement with the clutch elements of said gears, the adjacent inner edges of said heads being oppositely or divergingly tapered to permit the pivotal movement of the heads to a position within the confines of said solid shaft, means normally urging said heads apart and means for sliding said solid shaft to bring said heads into cooperative relation with each of the several gears.

4. In a variable speed transmission, the combination with a tubular shaft, of a plurality of gears journalled thereon, said gears having clutch elements formed on their inner peripheries and said shaft having openings therein disposed one in the plane of each of said gears and means disposed within said shaft for clutching the several gears thereto, said means comprising a relatively short solid shaft disposed within and slidably fitting the bore of the tubular shaft, means connecting said solid shaft for rotation with said tubular shaft but permitting relative axial movements thereof, said solid shaft having a pair of opposed elongated grooves formed therein, a pair of arms disposed one in each of said grooves and each having an end pivoted therein, clutch heads formed on the opposite ends of the respective arms and adapted to be projected through said openings and into engagement with the clutch elements of said gears, the bottom walls of said slots converging toward the center of said shaft from a point adjacent said pivots to a point substantially midway of their lengths and thence extending in parallel relation and the inner edge of each of said arms being tapered outwardly from a point substantially midway of its length toward its respective ends, whereby to permit the pivotal movement of the said heads carried by said arms to a position within the confines of said shaft, means normally urging said heads apart and manually operable means for sliding said shaft.

HERBERT E. BROWN.